INVENTOR
HENRY J. SEJDA

BY
Mullin and Alter
ATTORNEYS

United States Patent Office 3,414,451
Patented Dec. 3, 1968

3,414,451
APPARATUS FOR WRAPPING PRESSURE
SENSITIVE TAPE AROUND AN ELON-
GATED ARTICLE
Henry J. Sejda, Lake County, Ind., assignor to Cee-Kay
Industries, Inc., Chicago, Ill.
Continuation-in-part of application Ser. No. 270,894,
Apr. 5, 1963. This application Oct. 23, 1965, Ser.
No. 503,778
13 Claims. (Cl. 156—353)

ABSTRACT OF THE DISCLOSURE

An apparatus for wrapping pressure sensitive tape around an article has a rotatable chuck in which said article is received with an initial bight of the tape and a tape feed mechanism providing an initial loop in the tape prior to feeding the same to the article.

---

This invention relates generally to an apparatus for wrapping an article and more particularly relates to an apparatus for wrapping pressure sensitive tape at spaced apart intervals to secure a plurality of elongated cables together.

This application is a continuation-in-part of my co-pending application, Ser. No. 270,894, filed Apr. 5, 1963 and entitled Apparatus for Wrapping Elongate Articles With Tape or the Like, and my co-pending application, Ser. No. 270,992, filed Apr. 5, 1963 now Patent No. 3,321,352 dated May 23, 1967 and entitled Apparatus for Wrapping Elongate Articles with Tape or the Like, Case No. 2.

Although the prior wrapping machines described in my said co-pending applications fulfill a need in the art of wrapping articles, specifically elongated cables, they however, included some undesirable features. For instance, each wrapping operation of the machine caused a specific length of pressure sensitive tape to be fed toward the wrapping chuck wherein the article was wrapped. Hence, if the tape feed mechanism was set for a particular length of tape and only a half of that length was used in a single wrapping operation, said particular length of tape would nevertheless still be fed. Moreover, when it was desired to test the specific or general operation of the wrapping machine without using tape, the tape feed mechanism would nevertheless still feed a length of tape. Consequently, quite often the tape adjacent the tape reel became tangled due to too much slack. To avoid this, it was necessary to either continually reset the tape feed mechanism or cut down the slack in the tape.

It is therefore a primary object of this invention to provide a wrapping apparatus having a tape feed mechanism which feeds a length of pressure sensitive tape which is equivalent to the length of tape used in a wrapping operation.

It is another primary object to provide a wrapping apparatus having a tape feed mechanism that only feeds a length of pressure sensitive tape, if a length of tape had been used in a wrapping operation. Hence, the operation of the machine may be tested without additional tape being fed to the wrapping chuck.

It is a primary feature of this invention to provide a tape feed mechanism that forms an initial loop of tape adjacent to the tape reel prior to feeding tape to an article. The tape feed mechanism only replenishes the length of tape taken from the initial loop for use in a wrapping operation.

It is a related feature to provide a tape reel associated with a stripper lever which moves between a predetermined forward position to a predetermined extreme backward position with respect to the wrapping chuck. Prior to feeding tape toward the wrapping chuck, the tape adjacent the tape reel has a loop. When moving toward the backward position, tape is stripped from the tape reel only if tape had been consumed from the loop in a wrapping operation.

Another undesirable feature of my prior wrapping machines was that after the cutting knife had severed a length of tape from its association with the tape reel, it would remain in contact with the wrapping chuck for a time interval and then move out of contact therewith. The effect of this was to substantially decrease the useful life of the cutting knife. Furthermore, while the cutting knife was in contact with the wrapping chuck, the free rotation of the wrapping chuck was impeded which consequently increased the possibility of damage occurring to the mechanical drive mechanism of the machine.

It is therefore another primary object of this invention to provide a tap severing mechanism that moves a cutting knife in contact with a wrapping chuck to sever a length of pressure sensitive tape and immediately thereafter removes the cutting knife from contact with the wrapping chuck.

It is a feature of this invention to provide a cutting cam operatively associated with the cutting knife to cause the same to contact the wrapping chuck and sever a length of pressure sensitive tape, and a positioning cam operatively associated with the cutting knife to cause the same to move out of contact with the wrapping chuck immediately after severing the length of tape.

It is another feature of this invention to fixedly attach the cutting cam and the positioning cam together whereby an adjustment of the cutting cam to vary the time in the wrapping operation when a length of pressure sensitive tape is severed from the tape reel, automatically makes the same adjustment for the positioning cam, to thereby insure the removal of the cutting knife from contact with the wrapping chuck immediately after the length of tape has been severed.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

(FIGS. 15 through 19 show the various positions of the cutter roller, cutting knife and wrapping chuck during the wrapping operation.)

General description of the machine

Figure 1:
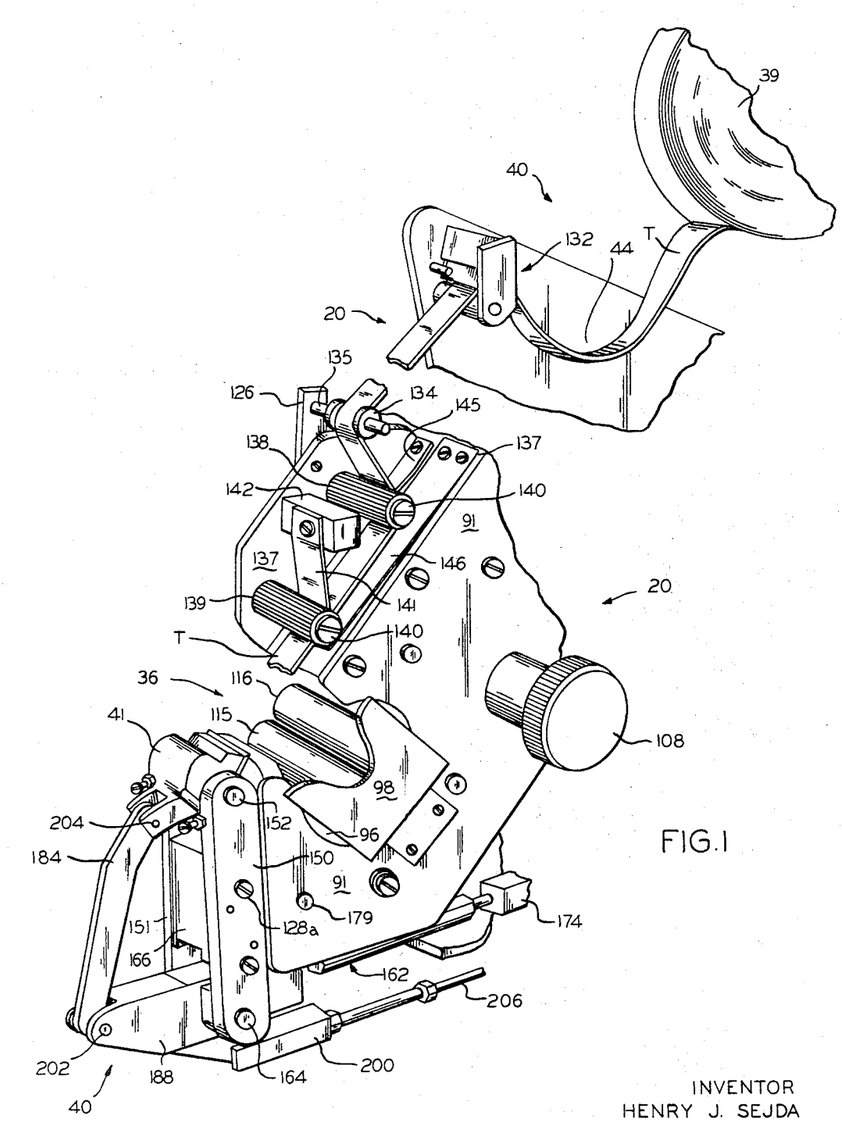
FIG. 1 is a fragmentary perspective view of the wrapping apparatus embodying the principles of the invention.
Figure 10:
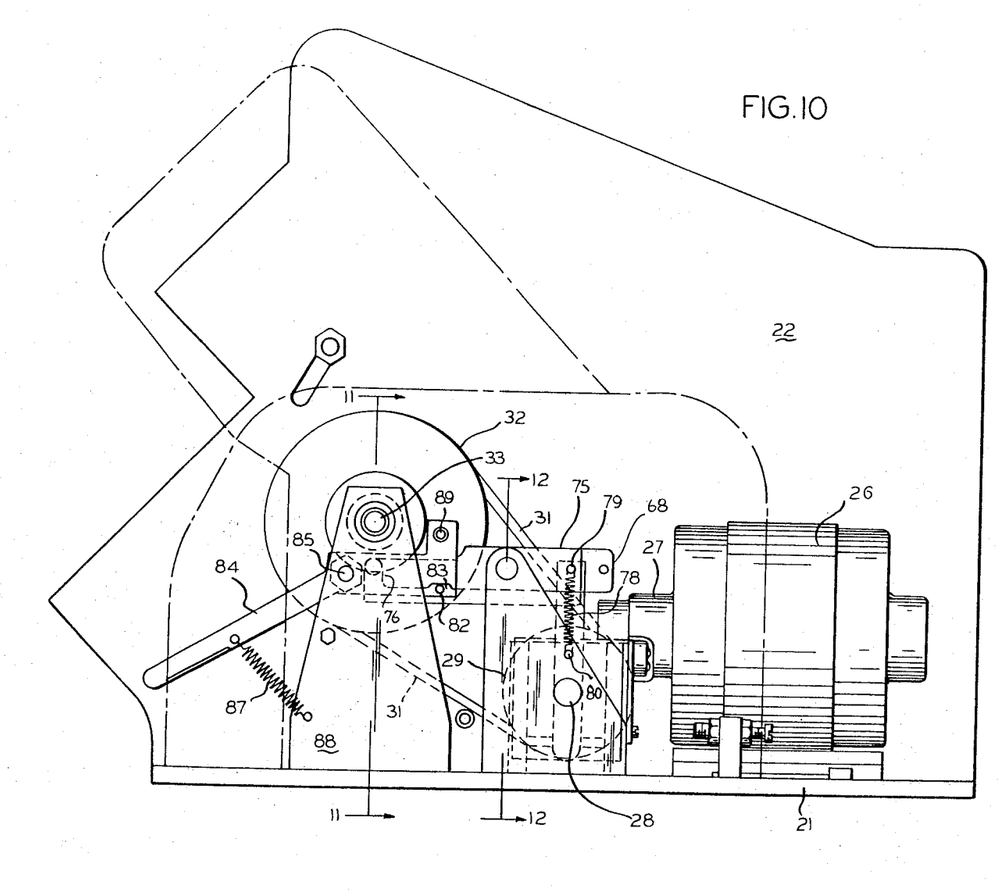
FIG. 10 is an elevational view illustrating the main electrical and mechanical power section of the wrapping apparatus.

Referring now to the drawings, the reference character 20 in FIG. 1 indicates generally an improved wrapping apparatus embodying the principle of the invention. As shown in FIG. 10, the tape wrapping apparatus 20 includes a base 21 supporting a frame 22. A drive motor 26 is mounted on the base 21 and is drivably connected to a speed reducer mechanism 27 having an output shaft 28. A motor pulley 29 is fast on the output shaft 28 and drives a belt 31 trained about a fly-wheel 32. Flywheel 32 is supported on a main drive shaft 33. A clutch mechanism 34 (see FIG. 11) is adapted to engage and disengage itself from the main drive shaft 33 to cause the same either to rotate or idle.

When the clutch 34 is engaged, the rotational force from the main shaft 33 is transmitted to the various sections of the wrapping apparatus to provide the following operations: rotary motion to a wrapping chuck 36 in order to securely wrap a length of pressure sensitive tape T around an article B which may be a plurality of elongated cables (see FIGS. 2 and 15 through 19); arcuate movement to a tape stripping mechanism 38 in order to strip off additional tape T from a tape reel 39 only if some tape T had been used in wrapping an article B (see FIG. 7); and a force to cause a tape severing mechanism 40 to sever a length of tape T to wrap the same around the article (see FIGS. 1, 2, 16 and 17).

Figure 15:
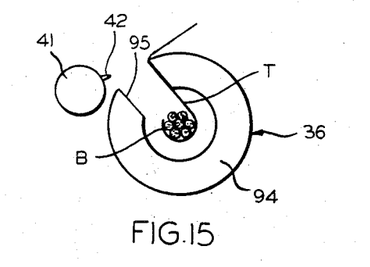
FIG. 15 is a side elevational view illustrating the position of the wrapping chuck and the cutting knife at the start of the wrapping operation and showing the article inside the wrapping chuck having an initial partial wrap.

The article B which is wrapped by the wrapping apparatus 20 is initially inserted into the wrapping chuck 36 over a portion of the adhesive side of the pressure sensitive tape T to provide an initial wrap or bight around article B (see FIG. 15). After a slight rotation of the wrapping chuck 36 during the wrapping operation, a cutter roller 41 having a cutting knife 42 mounted thereon rotates on its own axis to move the cutting knife 42 from a non-cutting position (shown in FIGS. 2 and 15) to a cutting position (shown in FIG. 16) to sever a length of tape T from its association with the tape reel 39. Immediately after the tape severing operation has been completed, the cutter roller 41 is rotated away from the wrapping chuck 36 to remove the contact of the cutting knife 42 with the wrapping chuck 36 (see FIG. 17).

Figures 7, 8, 9:
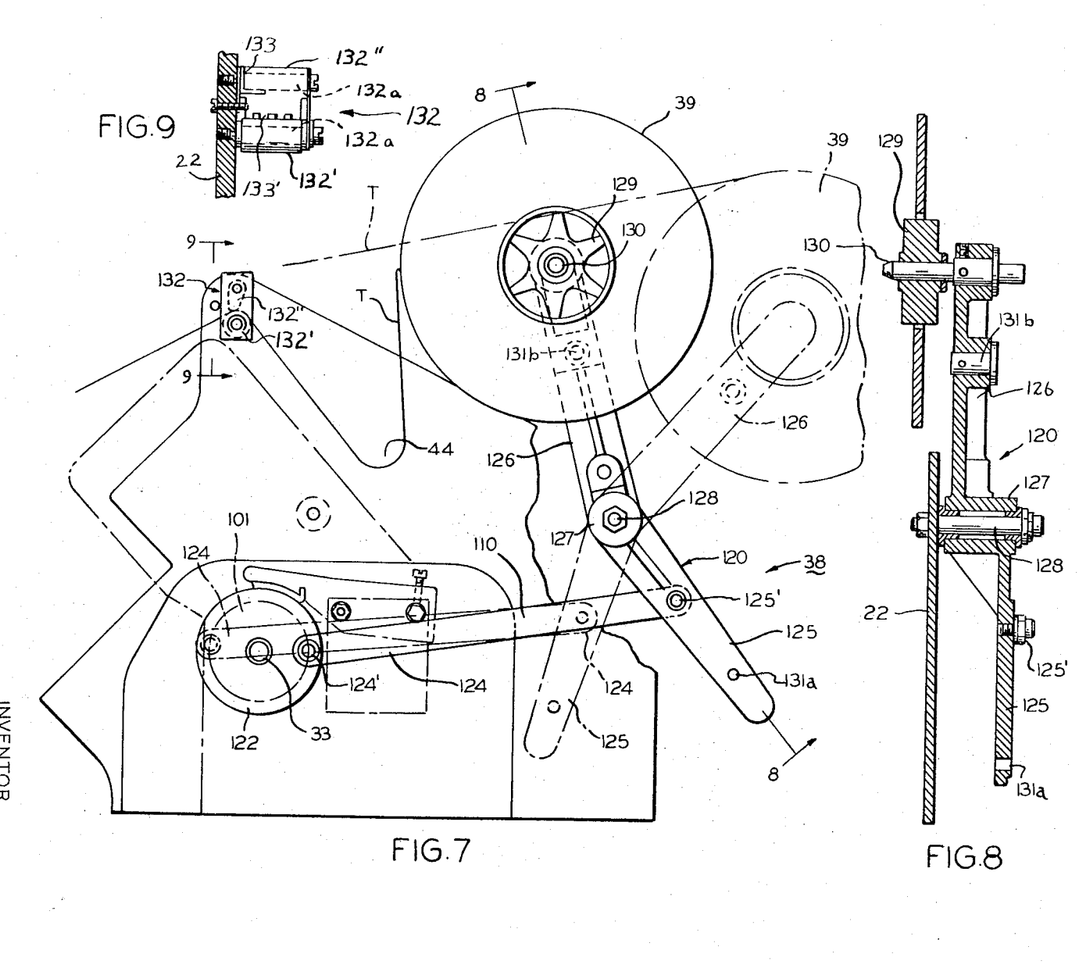
FIG. 7 is a fragmentary elevational view showing the tape stripping mechanism and looking in the opposite side of the frame with respect to the view in FIG. 6.
FIG. 8 is an elevational cross-section view taken on the plane of the line 8—8 in FIG. 7, viewed in the direction indicated, and showing the tape stripper lever.
FIG. 9 is a fragmentary sectional view taken on the plane of the line 9—9 in FIG. 7, viewed in the direction indicated, and showing the one-way gating means.

As shown in FIG. 7, the tape reel 39 has an extreme forward position and an extreme backward position (shown in phantom) with respect to the wrapping chuck 36. The tape reel 39 moves between the extreme positions simultaneously with the rotation of the wrapping chuck 36. Note that in the extreme forward position, the tape T has a loop or slack portion 44 immediately adjacent the tape reel 39. In the extreme backward position, however, the tape T (shown in phantom) is taut. Consequently, tape T is stripped from the tape reel 39 only if tape is used.

Clutch control

Figure 11:
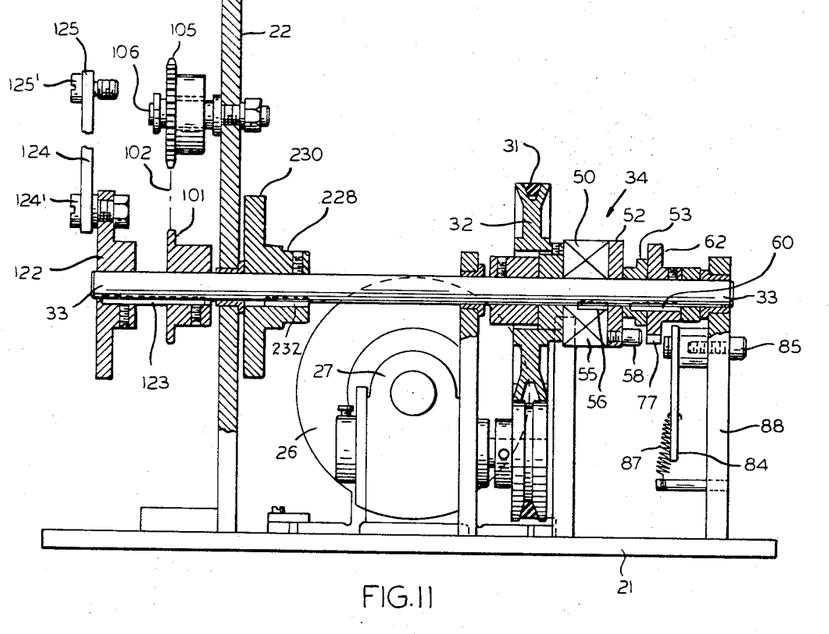
FIG. 11 is an elevational view taken on the plane of the line 11—11 in FIG. 10, viewed in the direction indicated, and showing details of the drive mechanism of the wrapping apparatus.

Turning now to FIG. 11, the clutch 34 controls the rotation of the main drive shaft 33. Clutch 34 comprises an outer clutching member 50 which is secured both to the flywheel 32 and clutch control members 52, 53 and a driven clutch member 55. The drive clutch member 55 includes a key 56 to drive shaft 33.

Clutch control member 52 has a pin 58 extending out therefrom. Clutching engagement between flywheel 32 and shaft 33 is had only when no restraint is imposed on pin 58.

Clutch 34 is a one revolution one-way type such as is manufactured by the Hilliard Corporation of Elmira, N.Y., and the details of operation of such clutch form no part of the invention herein, and it is sufficient to say that any controllable one-way one revolution clutch will suffice as well.

Figure 2:
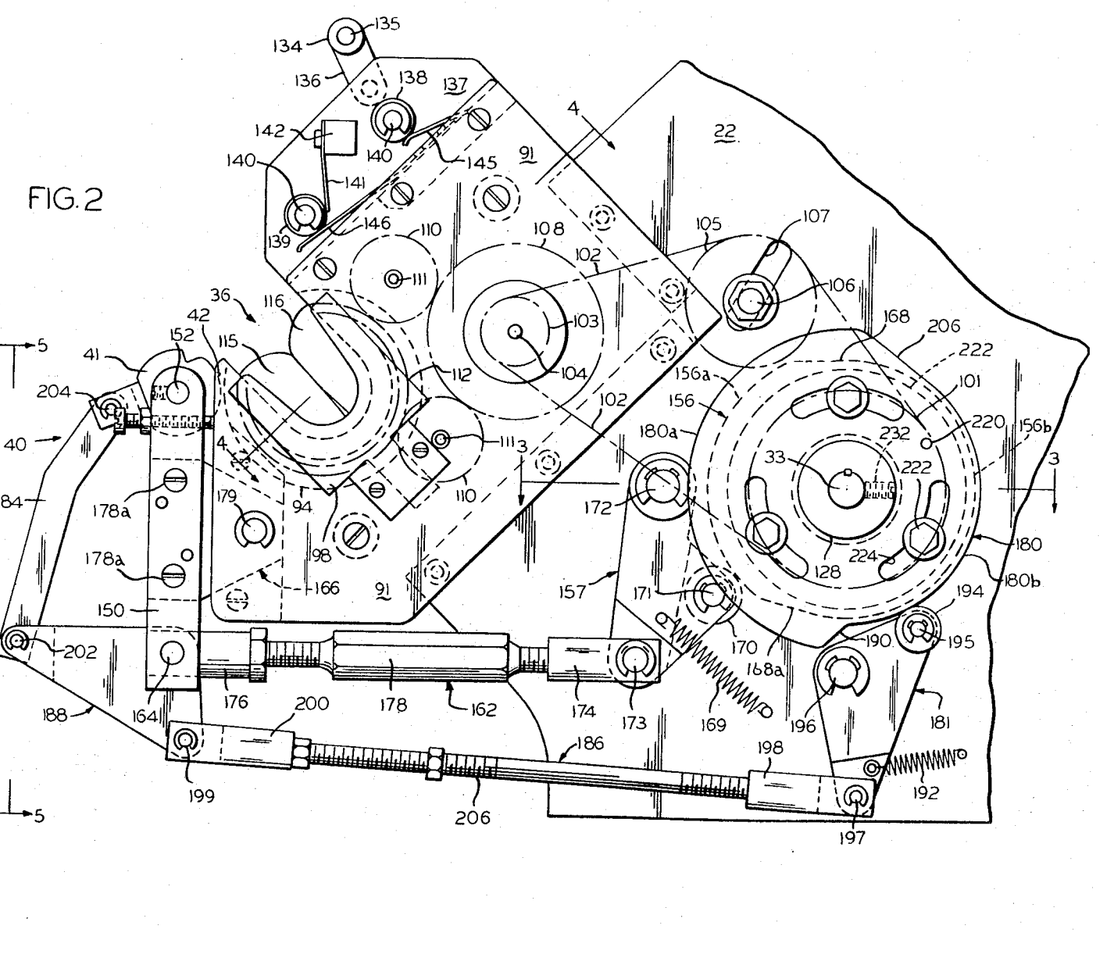
FIG. 2 is a fragmentary elevational view of the wrapping apparatus showing the wrapping chuck and the tape severing mechanism.
Figure 3:
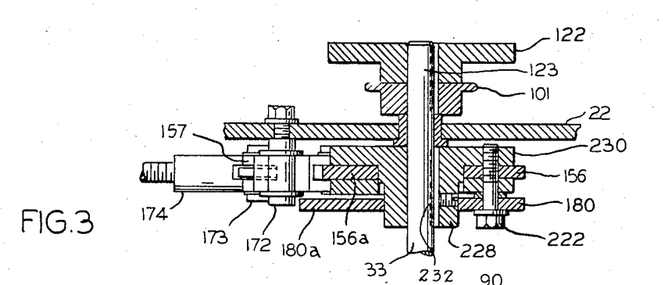
FIG. 3 is a fragmentary view taken on the plane of line 3—3 in FIG. 2, viewed in the direction indicated, and showing the elements of the tape stripping and tape severing mechanism which are operatively associated with the main drive shaft.

Clutch control member 53 is held fast to the main drive shaft 33 by means of a key 60, which also keys an indexing member 62 to the main drive shaft 33. When clutch 34 is disengaged from the main drive shaft 33, the wrapping chuck 36 is positioned as shown in FIG. 2 to receive an elongate article B for the wrapping operation.

In order to provide for the proper index position of the main drive shaft 33 and the proper index position of the wrapping chuck 36, structure controlled by a push type solenoid 65 (see FIG. 12) is provided for disengaging the one-way clutch 34, causing the driven clutch member 55 (FIG. 11) to index the position of the index member 62 fast on the main drive shaft 33.

Figure 12:
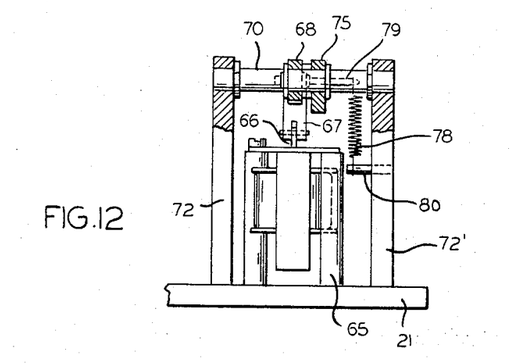
FIG. 12 is an elevational view showing the solenoid and associated elements which are used for controlling the clutching of the main drive shaft.

With reference to FIGS. 10, 11 and 12, the structure for disengaging the clutch and the index member 62 will be described. An armature 66 is connected to a link 67. A first pawl arm 68 is connected to link 67. The first pawl arm 68 is pivotally mounted on a support shaft 70 extending between a pair of spaced standards 72, 72' flanking the solenoid 65. When the solenoid 65 is deenergized, the end of the first pawl arm 68 is in engagement with pin 58 that extends from clutch control member 52 to release clutch 34 from the main drive shaft 33. When solenoid 65 is energized the first pawl arm 68 revolves and moves out of contact with pin 58 to enable clutch 34 to engage with the main drive shaft 33.

A second pawl arm 75 is likewise mounted for pivotal movement around the support shaft 70 (FIG. 12), and has an end 76 (FIG. 10) thereof adapted to normally engage a detent slot 77 in the indexing member 62 (FIG.

11) for properly indexing the main drive shaft 33. When the second pawl arm 75 is engaged with indexing member 62, clutch 34 is disengaged.

The second pawl arm 75 is biased in a clockwise direction as seen in FIG. 10 by a return spring 78 constrained between a bar 79 extending from the second pawl arm 75 and a hook 80 extending from the standard 72′ (see FIG. 12). The second pawl arm 75 has a pin 82 (FIG. 10) extending therefrom which extends into a cut-out portion 83 in the first pawl arm 68, so that the clockwise rocking movement of the second pawl arm 75, also rocks the first pawl arm 68 in a similar direction. Hence, when the solenoid is deenergized the first pawl arm 68 is in contact with pin 82 extending from the second pawl arm 75 (FIG. 10) and the second pawl arm 75 engages the detent slot 77 in the indexing member 62 (FIG. 11). Upon energization of solenoid 65, counterclockwise rotation of the first pawl arm 68 rocks the second pawl arm 75 in a similar direction by means of the force applied by pin 82.

The solenoid 65 is energized only for a period of time sufficiently to cause the pawl arms 68 and 75 respectively to move out of contact with pin 58 and out of engagement with the detent slot 77. Since clutch 34 is a one revolution clutch, it provides clutching engagement for one revolution of shaft 33 until the first pawl arm 68 comes into engagement with the pin 58, at which time the clutch is released. The release of the clutch takes place at a small time interval prior to the engagement of the second pawl arm 75 with the detent slot 77. After one revolution of the main drive shaft, the wrapping chuck 36 returns to the starting position for the wrapping operation, as shown in FIGS. 1 and 15.

The first pawl arm 68 and the second pawl arm 75, in addition to being released by the action of the solenoid 65, may be manually released by a release lever 84 (FIG. 10). Release lever 84 is pivotally associated with the bracket 88 on a stub shaft 85. Release lever 84 is adapted to be rocked about a stub shaft 85 in a clockwise direction against the biasing force of a spring 87. Spring 87 is connected between the release lever 84 and a support bracket 88 for the main drive shaft 33.

Release lever 84 includes a pin 89 (FIG. 10) extending therefrom which is normally out of engagement with the pawl arms 68, 75. When release lever 84 is rocked in a clockwise direction, pin 89 abuts against the pawl arms 68, 75 to release the contact of the first pawl arm 68 with pin 58 and to disengage the second pawl arm 78 from the detent slot 77 and thereby cause a driving connection between motor 26 and the main drive shaft 33 which results in the operation of the wrapping apparatus 20. During normal operation of the wrapping apparatus, release lever 84 is not operated, and the solenoid 65 is employed as sole control of the rotation of the main drive shaft 33.

*Article wrapping chuck*

Referring now particularly to FIGS. 1, 2, 4, 11, 13 and 14 of the drawings, the wrapping chuck 36 is mounted for rotation in a pair of spaced bearing support plates 90 and 91 (FIG. 4) which form a part of the frame 22. Support plates 90, 91 are held in spaced relationship by spacer members 92.

Figure 13:
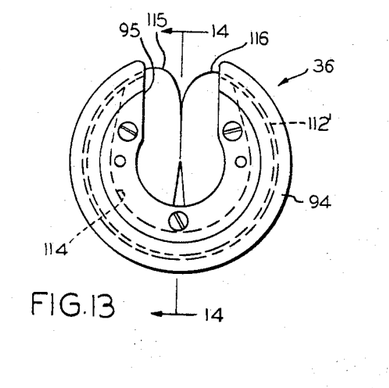
FIG. 13 is a side view of the wrapping chuck, taken substantially on the plane of line 13—13 in FIG. 4 and viewed in the direction indicated with the guide jaws 98 removed.
Figure 14:
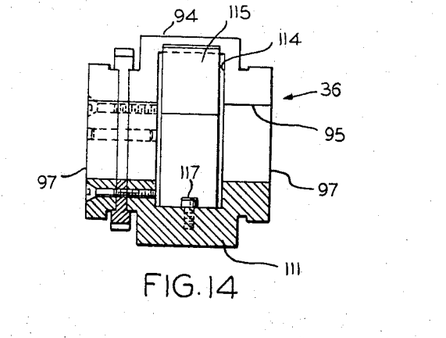
FIG. 14 is a sectional view of the wrapping chuck taken on the plane of line 14—14 in FIG. 13 and viewed in the direction indicated.

As seen in FIGS. 13 and 14, the wrapping chuck 36 includes an essentially barrel shaped body member 94 having a receiving jaw 95 adapted to receive the article B for wrapping a length of tape T at spaced intervals. The support plates 90 and 91 have slots 96 (FIG. 1) therein which are arranged to provide passage for the article B into the jaw 95 of the wrapping chuck 36. The sides of the wrapping chuck 36 adjacent slots 96 are flanked by guide jaws or work supports 98 (FIGS. 1 and 2) which are mounted to the bearing plates 90, 91. The size of guide jaws 98 and their position may be varied as desired according to the size of the article B.

When the wrapping chuck 36 rotates, it wraps a length of tape T around the article B. To accomplish this rotation, a drive sprocket 101 is fastened to the main drive shaft 33 (see FIGS. 2 and 11) and engages a sprocket chain 102 which turns a chuck drive sprocket 103 (see FIGS. 2 and 4). Chuck drive sprocket 103 is fast on a chuck drive shaft 104 journalled in the spaced support plates 90, 91.

An idler sprocket 105 (FIG. 2) is mounted on a stub shaft 106 supported in frame 22 and serves to take up slack in the sprocket chain 102. The position of the idler sprocket 105 may be carried by adjusting stub shaft 106 within slot 107.

If the main drive shaft 33 is not rotating, the chuck drive shaft 104 may be revolved by hand wheel 108 (FIG. 4), to cause responsive rotation of the chuck drive sprocket 103.

Figure 4:
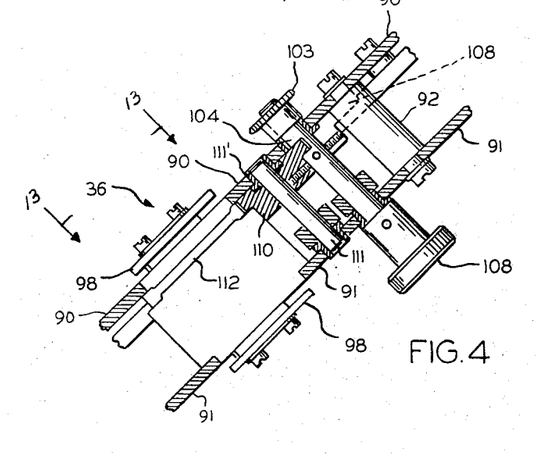
FIG. 4 is a fragmentary plan sectional view taken on the plane of the line 4—4 in FIG. 2, viewed in the direction indicated, and showing the wrapping chuck and adjacent elements.

As may be seen in FIG. 2, a driving gear 108 is fast on the chuck drive shaft 104 and meshes with a pair of chuck idler gears 110 mounted on idler shafts 111. Idler shafts 111 are held at their ends by bushings 111′ (FIG. 4). Idler gears 110 in turn mesh with a chuck driven gear 112 which is fast on the body 94 of the wrapping chuck 36 (see FIGS. 2 and 13).

The barrel shaped body member 94 of wrapping chuck 36 defines a cavity 114 (FIGS. 13 and 14) in which a pair of resilient fingers 115 and 116 are housed (see FIGS. 1 and 14). The two resilient fingers 115 and 116 cooperate to hold the article B in place as a length of tape T is tightly wrapped about the article B when the wrapping chuck 36 rotates.

*Tape feeding and stripping mechanism*

As illustrated in FIG. 7, the tape reel 39 of the tape feeding and stripping mechanism 38 is operatively associated with a stripper lever 120, to move from a predetermined extreme forward position to a predetermined extreme backward position with respect to the wrapping chuck 36. Prior to the feeding of tape T toward the wrapping chuck 36, a loop or slack portion 44 is present in the stripped tape adjacent the tape reel 39. When the loop is present in the tape, the tape reel 39 is normally at or near the extreme forward position. As the tape reel 39 moves toward the extreme backward position, tape is normally stripped from the tape reel to replenish substantially the equivalent tape consumed in a wrapping operation. In the preferred operation, when the tape reel 39 is in the extreme backward position, the tape is taut as shown in FIG. 7. Hence, the tape is stripped from the tape reel prior to the tape reel reaching the extreme backward position if tape had been used in the wrapping operation. Note that when tape T is stripped from the tape reel 39, its pressure sensitive or adhesive surface is on the upper side thereof.

With reference to FIGS. 2, 3, 6, 7, 8 and 11, the structural details of the tape stripping mechanism 38 will be described. A crank member 122 (FIG. 7) is keyed to the main drive shaft 33 by key 123 (FIG. 11). One end of a crank lever 124 is connected at an off-center point adjacent the outer periphery of the crank member 122 by screw 124′. The outer end of crank lever 124 is fixedly associated with the stripper lever 120 at the lower section 125 thereof by a screw 125′.

The upper section 126 of stripper lever 120 is integrally formed to the lower section 125 thereof by hub 127 (FIG. 8) having a cylindrical opening. A lever shaft 128 extends within the opening of hub 127 and is rotatably journalled to frame 22. Stripper lever 120 is on the lever shaft 128.

The upper section 126 of stripper lever 120 is fixedly disposed at the upper end thereof to a core 129 of tape reel 39 and held in place thereat by a ball lock pin 130.

Simultaneously with the rotation of the main drive shaft 33, the tape reel 39 moves in an arcuate path between an extreme forward position and an extreme backward position with respect to chuck 36. As particularly shown in FIG. 7, the tape reel 39 is rocked into the extreme forward position when crank lever 124 forces the lower section 125 of stripper lever 120 to an extreme backward position. Conversely, the tape reel 39 is rocked into the extreme backward position when crank lever 124 forces the lower section 125 of the stripper lever 120 to an extreme forward position (shown in phantom).

Means are provided to vary the magnitude of loop 44 when the tape reel 39 is in the extreme forward position. As shown in FIG. 7, opening 131a is included in the bottom section 125 of stripper lever 120 to provide an additional mounting position for crank lever 124. If crank lever 124 were mounted to the stripper lever 120 at opening 131a the loop 44 would be decreased since the length of the arcuate path of travel of tape reel 39 from an extreme forward to an extreme backward position would be decreased.

Also, an opening 131b is provided in the upper section of stripper lever 120 to received the ball lock pin 130. If the tape reel 39 were mounted to the stripper lever 120 at opening 131b, the loop 44 at the extreme forward position of the tape reel 39 would be decreased, since the length of arcuate travel of tape reel 39 is decreased although the angular displacement remains constant. If additional variations in the length of loop 44 are desired, more mounting openings or other mounting means for the tape reel 30 or crank member 124 could be positioned along the stripper lever 120. Moreover, the arcuate length of travel of the tape reel 39 could be increased by lengthening the upper section 126 of the stripper lever 120 and mounting the tape reel 39 at the uppermost part thereof.

A one-way gating means 132 (FIG. 7) permits the passage of tape T toward the wrapping chuck 36, but prevents tape once having passed through, to return toward the tape reel 39. Hence, tape reel 39 may move backward away from gating means 132 for stripping tape from the tape reel 39, without pulling any tape back through the gating means 132. Consequently, if tape T is stripped from tape reel 39, the length of stripped tape T would correspond to the length of tape T used from the tape loop 44 during the wrapping operation.

As shown in FIG. 9, the one-way gating means 132 includes a tension roller 132' and a substantially rectangular plate 132". The tension roller 132' and plate 132" are mounted on spaced apart shafts 132a. The tape T that is fed from the tape reel 39 to the wrapping chuck 36 passes between and in contact with the tension roller 132', and the plate 132". A spring 133 attached to frame 22 resiliently urges the lower end of plate 132" into a tight association with the pressure sensitive tape. This prevents the tape from going back through the gating means 132 when the tape reel 39 moves toward its extreme backward position. To minimize contact with the adhesive side of the pressure sensitive tape, notches may be included in the lower end of plate 132" to provide a plurality of spaced apart fingers 133'.

A first idler roller 134 supports the tape T after it passes through the gating means 132 (see FIG. 1). The first idler roller 134 is positioned on a stub shaft 135 which extends from a supporting finger 136 fastened to the idler wall portion of a right angled support bracket 137. A second idler roller 138 and a third idler roller 139 are spaced from each other and each turn on a pin shaft 140 mounted on support bracket 137. The second and third idler rollers may have knurled surfaces.

A length of clock spring 141 is supported on a block 142 secured in any convenient fashion to a support bracket 137. The clock spring 141 is resiliently urged toward the third idler roller 139 and cooperates therewith to prevent its reverse movement.

Plate springs 145, 146 are fastened to the base portion of the right angled bracket 137 and extend respectively underneath and in contact with the second and third idler rollers 138, 139. Thus, tape T after passing over the first idler roller 134 is fed underneath the second and third idler rollers 138, 139, and tightly constrained therebetween by their respective plate springs 145, 146. Also, tape T is prevented from having reverse movement by reason of clock spring 141 cooperating with the third idler roller 139. Hence, the tape T passes through the gating means 132, over the first idler roller 134 and under idler rollers 138, 139 to the wrapping chuck 36.

*Tape severing mechanism*

The tape severing mechanism 40 severs a length of tape T which is fed from the loop 44 and the severed length of tape is used to securely wrap the articles B inside the wrapping chuck 36. Before the severing operation, article B is placed on the pressure sensitive side of tape T and manually forced into place inside the wrapping chuck 36, so that there is an initial partial wrap around article B (see FIG. 15). The manual force applied to article B also pulls additional tape T from loop 44 toward wrapping chuck 36. After the wrapping chuck 36 rotates slightly, the cutting knife 41 comes into contact with the outer periphery of the wrapping chuck 36 and severs a length of tape T from its association with the tape reel 39 (see FIG. 16). Immediately following the cutting stroke of cutting knife 42, the cutter roller 41 rotates and moves cutting knife 42 away from its contact with the wrapping chuck (see FIG. 17). Hence, frictional contact of the cutting knife 42 with the wrapping chuck 36 is kept to a minimum. Article B becomes completely and securely wrapped with the severed length of tape T, as the wrapping chuck 36 continues to rotate (see FIG. 18).

Turning now to FIGS. 1, 2, 3, 5 and 15 through 19, the structural details for the tape severing mechanism 40 will now be described. The cutter roller 41 is journalled between a pair of support arms 150, 151 by pin 152 (see FIG. 5). FIGS. 2 and 15 illustrate the position of the cutter roller 41 and cutting knife 42 prior to the start of the wrapping operation. Note, that the cutting knife 41 is spaced from the barrel body 94 of the wrapping chuck 36.

The coaction of a positioning cam 156 having an enlarged diameter portion 156a and a reduced diameter portion 156b with a positioning cam follower 157, determines the position of the cutter roller 41 with respect to the wrapping chuck 36 (see FIG. 2). A change in position of the positioning cam follower 157 is transmitted along a connecting means to the cutter roller 41 to cause the same to move arcuately toward or away from the wrapping chuck 36. The connecting means comprises a coupling member 162 which transmits motion to bar 164 which in turn, causes responsive movement in arms 150, 151. A pivot block 166 translates the motion of the arms 150, 151 to a rotational force which arcuately varies the position of the cutter roller 41.

The transition from the enlarged diameter portion 156a to the reduced diameter portion 156b occurs along the inwardly inclined segments 168 and causes the cutter roller 41 to move arcuately away from the wrapping chuck 36. The transition from the reduced diameter portion 156b to the enlarged diameter portion 156a occurs along the outwardly inclined segment 168a and causes the cutter roller 41 to move arcuately toward the wrapping chuck 36. An elongated coil spring 169 (FIG. 2) resiliently urges the positioning cam follower 157 toward the reduced diameter portion 156b.

The positioning cam follower 157 comprises a positioning roller follower 170 mounted on a stub shaft 171 and trained on the positioning cam 156. A pivot pin 172 is pivotally associated with frame 22 around which the positioning cam follower 157 rotates in response to the roller follower 170 moving along the inclined segment 168 from the enlarged diameter portion 156a to the reduced diameter portion 156b and from the reduced diameter portion 156b to the enlarged portion 156a along the inclined segment 168a. A pin 173 pivotally associates the positioning cam follower 157 with the back end section 174 of the coupling member 162.

The front end section 176 of the coupling member 162 is rigidly attached to the bar member 164. Bar member 164 is connected between the lower ends of arms 150, 151.

Interposed between the back end section 174 and the front end section 176 of the coupling member 162 is a rod member 178. As may be seen from FIG. 2, the length of the rod member 178 may be varied by screwing the same inwardly or outwardly from either or both of the end sections 174, 178. The adjustment of the total length of coupling member 162 by varying rod member 178 serves as an adjustment of the position of the cutter roller 41 with respect to the wrapping chuck.

Figure 5:
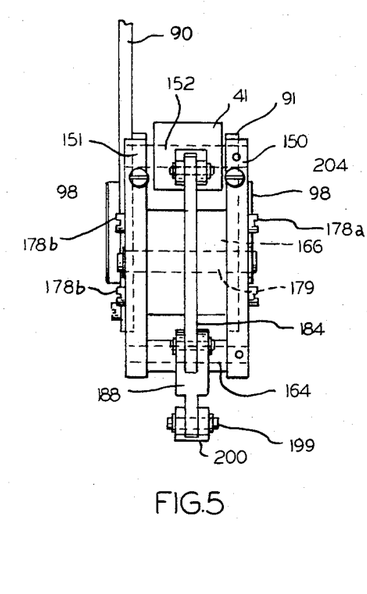
FIG. 5 is a fragmentary elevational view taken on the plane of the line 5—5 in FIG. 2, viewed in the direction indicated, and illustrating elements of the tape severing mechanism.
Figure 6:
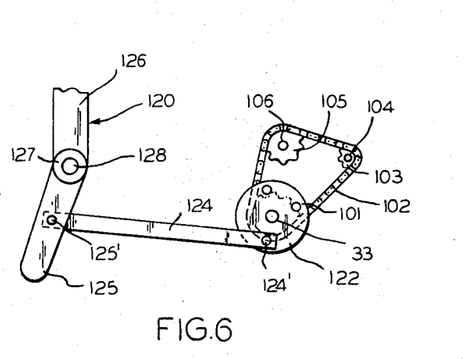
FIG. 6 is a fragmentary front view of the drive elements for the tape stripping mechanism.

The pivot block 166 is rigidly attached to arm 150 by holding screws 178a and to arm 151 by holding screws 178b (FIG. 5). The pivot block 166 pivots with arms 150, 151 on a pivot pin 179 which is supported at its ends on support plates 90, 91.

The tape severing operation is controlled by the coaction of a cutter cam 180 with the cutter cam follower 181 (see FIG. 2). A change in position of the cutter cam follower 181 along the cutter cam 180 is transmitted as a rotational force to the cutter roller 41 via a connecting means comprising a rocker arm 184 pivotally associated with a connecting member 186 by a bell crank 188. The transmitted rotational force causes the cutter roller 41 to either rotate toward or away from the wrapping chuck 36.

The cutter cam 180 is fixedly mounted to the main drive shaft 33 and includes an enlarged diameter portion 180a and a reduced diameter portion 180b. The transition of the cutter cam follower 181 from the reduced diameter portion 180b to the enlarged diameter portion 180a occurs along the steep inclined segment 190 and causes the cutting roller 41 to move through its cutting stroke to sever a length of tape T. A coil spring 192 resiliently urges the cutter cam follower 181 toward the reduced diameter portion 180b of the cutter cam 180.

The cutter cam follower 181 comprises a cutter roller follower 194 mounted on a shaft 195 and trained on the cutter cam 180. The cutter roller follower 194 rotates around a pivot pin 196 in response to the change of position of the cutter cam follower 181 along the cutter cam 180. The pivot pin 196 is attached to frame 22. Another pivot 197 pivotally associates the cutter cam follower 181 with the rear section 198 of the connecting member 186.

A pin 199 connects the forward end section 200 of connecting member 186 with the bell crank 188. Pin 202 connects the rocker arm 184 with the bell crank 188. Bell crank 188 is pivotally associated with bar member 164 and pivots thereon in response to the force applied by the connecting member 186, when the cutter cam follower pivots on pin 196.

Pin 204 pivotally associates the rocker arm with the cutter roller 41. Consequently, as the bell crank 188 pivots on bar member 164, cutter roller 41 rotates around pin 152.

Interposed between the rear end section 198 and the forward end section 200 of the connecting member 186 is a bar member 206. Similar to the rod member 178, the length of the bar member 206 may also be varied by screwing the same inwardly or outwardly from either or both of the end sections 198, 200 of the connecting member 186. The adjustment of the total length of the connecting member 186 controls the beginning and ending of the cutting stroke by varying the position of cutter roller 41.

As shown in FIG. 2, prior to the start of the wrapping operation, cutting knife 42 is spaced from the wrapping chuck 36, the positioning roller follower 170 is in contact with the enlarged diameter portion 156a of the positioning cam 156 and the cutter cam follower 181 rests on the reduced diameter portion 180b of the cutter cam 180. When the wrapping chuck 36 starts to rotate to begin the tape wrapping operation, the cutter roller follower 194 travels from the reduced diameter portion 180b to the enlarged diameter portion 180a along the inclined segment 190. This causes the cutter cam follower 181 to pivot clockwise around pin 196. The connecting member 186 correspondingly moves forward and at the same time forces bell crank 188 to rotate clockwise around bar 164. In response, rocker arm 184 rotates cutter roller 41 clockwise, whereupon the cutting knife 42 moves to a cutting position and contacts the outer periphery of the body 95 of the wrapping chuck 36 to sever a length of tape T. Immediately after the length of tape T has been severed, the positioning roller follower 170 travels from the enlarged diameter portion 156a to the reduced diameter portion 156b along the inclined segment 168 and causes the positioning cam follower 157 to swing counterclockwise around pin 72. The coupling member 162 responds by moving in a backward direction and thereby forcing the pivot block 166 in turn, to swing counter-clockwise around pivot pin 179. This causes arms 150, 151 to move the cutter roller 41 so that the cutting knife 42 is removed from its contacting association with the periphery of the wrapping chuck 36 (see FIG. 17).

After the cutter roller 42 and cutting knife have been moved from their contacting association with the wrapping chuck 36, the cutter roller follower 194 travels from the increased diameter portion 180a to the reduced diameter portion 180b of cutter cam 180 along incline 206 to cause the cutter cam follower 181 to rotate counterclockwise forcing the connecting member to move in backward direction. The bell crank 188 in response, rotates counter-clockwise to force the cutter roller 41 to revolve around pin 152 to position the cutting knife 42 in a non-cutting position (see FIG. 18).

Figure 19:
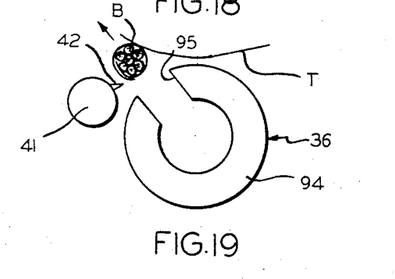
FIG. 19 is a view similar to FIG. 15, but showing the position of the cutter roller and cutting knife at the end of the wrapping operation and the elongate article being removed from the wrapping chuck.

A short time interval after the cutting knife 42 has moved to the non-cutting position, the positioning roller follower 170 moves from the reduced diameter portion 156b to the increased diameter portion 156a of cam 156 along the slope 168 causing the pivot block 166 to rotate clockwise and the cutter roller 41 with cutting knife 42 in response thereto, to rotate clockwise toward the wrapping chuck 36 (see FIG. 19). When the tape severing mechanism 40 is in this position, a wrapping cycle has been completed and the wrapping apparatus 20 is in position for another wrapping operation.

To maintain the above described sequence of operation, a dowel pin 220 fixedly connects the positioning cam and cutter cam together, so that if an adjustment is necessary for varying the length of T of the severed tape for wrapping article B, both the positioning cam 156 and the cutter cam 180 are adjusted simultaneously. The position of the positioning cam 156 and the cutter cam 180 may be adjusted by loosening screws 222 within the arcuate slots 224 and rotating the cams around hub 228. As shown in FIG. 11, hub 228 has integrally formed to the cam supporting plate 230 and keyed to the main drive shaft 33 by key 232. The adjusting of the position of the cams 156, 180 controls the time in the wrapping operation when the cutting stroke commences.

*Summary*

Before the start of the wrapping operation, the wrapping chuck 36 is in the position shown in FIGS. 1 and 2 and an initial loop 44 in tape T is presented adjacent the tape reel 39. The article B to be wrapped is placed on the adhesive side of the pressure sensitive tape T and manually inserted into the wrapping chuck 36 between the resilient fingers 115, 116 causing tape to be pulled toward the wrapping chuck from loop 44. As shown in FIG. 15, article B has an initial bight prior to the rotation of the wrapping chuck.

Figure 16:
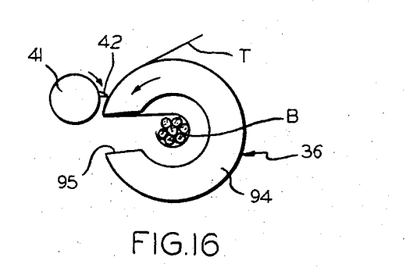
FIG. 16 is a view similar to FIG. 15, showing the position of the wrapping chuck and the cutting knife immediately prior to severing a length of tape.
Figure 17:
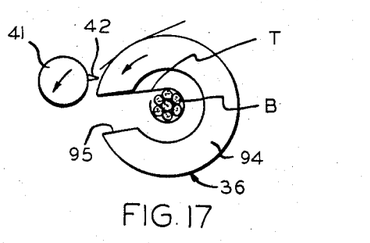
FIG. 17 is a view similar to FIG. 16, but showing the position of the cutter roller immediately after a length of tape has been severed.
Figure 18:
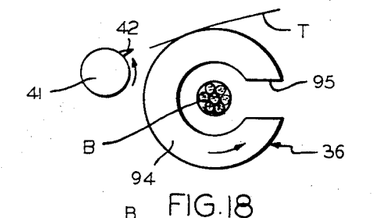
FIG. 18 is a view similar to FIG. 17, but showing the position of the cutting knife after it has been rotated to a non-cutting position.

When the main drive shaft 33 rotates upon engaging clutch 34, the automatic wrapping operation commences. Initially, as the wrapping chuck rotates, it pulls additional tape from loop 44. Simultaneously with the rotation of the wrapping chuck 36, the tape reel 39 moves toward the wrapping chuck 36 to an extreme forward position to provide additional slack in loop 44. A short time interval after the wrapping chuck has started rotation, cutting knife 42, due to the change of position of the cutter cam follower 181, contacts the periphery of the wrapping chuck 36 as shown in FIG. 16 and severs a length of tape T. Immediately after the severing operation, the cutter roller 41 due to the change of the position of the positioning cam follower 157 arcs to the position shown in FIG. 17, thereby removing the cutting knife 42 from contact with the wrapping chuck 36. Hence, the wrapping chuck continues to rotate uninhibited by the pressure from the cutting knife.

Concurrently with the rotation of the wrapping chuck 36, the tape reel 39 moves to its extreme forward position and then to its extreme backward position with respect to the wrapping chuck 36 to strip a length of tape T from the tape reel equivalent to the severed length of tape T used in the wrapping of the article B.

Upon the completion of the wrapping operation, the wrapping chuck 36 has returned to its original position shown in FIG. 19, and the article B may be lifted out of the wrapping chuck or pulled outward from the side of the wrapping chuck so that another wrap could be placed at a point spaced from the previous wrap.

From the foregoing description and drawings, it should be apparent that I have provided a novel wrapping apparatus of greatly simplified and improved construction which accomplishes the aforestated objects and features in a remarkably unexpected fashion. The tape stripping mechanism 38 only supplies tape T to replenish tape used in a tape wrapping operation. Moreover, the cooperation of the cutter cam 180 with the positioning cam 156 forces the cutting knife 42 out of contact with the wrapping chuck 36 immediately after the tape severing operation.

It is believed that my invention, its mode of construction and assembly, and many of its advantages should be readily understood from the foregoing without further description, and it should also be manifest that while a preferred embodiment of the invention has been shown and described for illustrative purposes, the structure details are nevertheless capable of wide variation within the purview of my invention as defined in the appended claims.

What I claim and desire to secure by Letters Patent of the United States is:

1. A wrapping apparatus for wrapping pressure sensitive tape around an article comprising:
   a frame;
   a drive means;
   a wrapping chuck mounted in said frame and receiving said article for wrapping same, said article having an initial bight of said tape when received in said wrapping chuck, said wrapping chuck being rotatably associated with said drive means to wrap a length of tape around said article;
   a tape feed mechanism to feed said pressure sensitive tape to said article, said tape feed mechanism providing an initial loop in said tape prior to feeding said tape to said article and replenishing substantially said length of tape consumed from said loop to wrap said article; and
   a tape severing mechanism to sever said length of tape for wrapping said article, wherein said tape feed mechanism comprises:
      a tape reel having pressure sensitive tape thereon; and
      means for moving said tape reel between an extreme forward position and an extreme backward position with respect to said wrapping chuck, said tape reel moving toward said backward position strips a length of tape from said tape reel substantially equal to said length of tape consumed in the wrapping operation.

2. A wrapping apparatus as defined in claim 1, wherein said tape reel moves in an arcuate path from said predetermined extreme forward and backward positions.

3. A wrapping apparatus as defined in claim 1, wherein said means for moving said tape reel is operatively associated with said drive means, said tape feed mechanism moving between said extreme positions simultaneously with the rotation of said wrapping chuck.

4. A tape feed mechanism as defined in claim 1, wherein said means for moving said tape reel includes means for varying the distance between said extreme positions to correspondingly vary the length of said initial loop in said tape prior to feeding tape to said article.

5. A wrapping apparatus as defined in claim 3, wherein said means for moving said tape reel comprises:
   a stripper lever having an upper section and a lower section, said stripper lever being rotatably journalled to said frame between said sections, said tape reel being connected to the upper section of said stripper lever;
   a crank member rotatably journalled to said drive means; and
   a crank lever rigidly connected at the forward end to said crank member adjacent the outer periphery of said crank member, the back end of said crank lever being rigidly connected to the lower section of said stripper lever, the rotation of said crank member causing said stripper lever to pivot and thereby forcing said tape reel to move between said extreme positions.

6. A wrapping apparatus as defined in claim 5, wherein said tape feed mechanism includes a gating means positioned between said tape reel and said wrapping chuck, said gating means permitting forward movement of said pressure sensitive tape toward said wrapping chuck for wrapping said article, said gating means preventing movement of said pressure sensitive tape back through said gating means toward said tape reel when said tape reel moves toward said extreme backward position to strip tape for replenishing said loop.

7. A wrapping apparatus as defined in claim 5, wherein said stripper lever includes spaced apart mountings for varying the distance between said extreme positions of said tape reel and correspondingly varying the tape in said loop prior to the feeding of tape toward said wrapping chuck, the greatest distance between said extreme positions occurring when said tape reel is mounted to the uppermost of said mountings.

8. A wrapping apparatus as defined in claim 5, wherein said tape severing mechanism comprises:
   a cutting knife to sever said length of tape;
   cutting control means operatively associated with said cutting knife and said driving means to move said cutting knife from a non-cutting position to a cutting position in contact with said wrapping chuck for severing said length of tape; and
   positioning means operatively associated with said cutting knife to move said cutting knife out of contact with said wrapping chuck immediately after severing said length of tape.

9. A wrapping apparatus for wrapping pressure sensitive tape around an article comprising:
   a frame;
   a drive means;
   a wrapping chuck mounted in said frame and receiving said article for wrapping same, said article having an initial bight of tape when received in said wrapping chuck, said wrapping chuck being rotatably associated with said drive means to wrap a length of tape around said article;
   a tape feed mechanism to feed said pressure sensitive tape to said article;
   a cutting knife to sever said length of tape;
   cutting control means operatively associated with said cutting knife to move said cutting knife from a non-cutting position to a cutting position in contact with said wrapping chuck for severing said length of tape; and positioning means operatively associated with said cutting knife to move said cutting knife out of contact with said wrapping chuck immediately after severing said length of tape, wherein said cutting control means includes; a cutter cam operatively associated with said drive means, said cutter cam having an increased diameter portion and a reduced diameter portion, a cutter cam follower trained on said cutter cam and varying in position when traveling from one of said portions to the other of said portions of said cutter cam, and a coupling means for transmitting the change of positions of said cutter cam follower to said cutting knife to cause the same to move toward said wrapping chuck to contact the same and sever said length of tape; and said positioning means includes; a positioning cam operatively associated with said drive means, said positioning cam having an increased diameter portion and a reduced diameter portion, a positioning cam follower trained on said positioning cam and varying in position when traveling from one of said portions to the other of said portions of said positioning cam, and a connecting means for transmitting the change of position of said cutter cam follower to said cutting knife to cause the same to move away from said contact with said wrapping chuck after the severing of said length of tape.

10. A wrapping apparatus as defined in claim 9, wherein said cams are adjustable on said drive means to vary the time for cutting said tape and correspondingly to vary the magnitude of said length of tape, and means is included to fixedly connect said cutter cam with said positioning cam to insure the sequence of operation whereby said positioning cam follower causes said cutting knife to move out of contact with said wrapping chuck immediately after severing the tape.

11. A wrapping apparatus as defined in claim 9, wherein:

a cutter roller supports said cutting knife; said cutter roller being rotatably journalled between a pair of arms; and said connecting means of the positioning means includes a pivot block pivotally associated with said frame and connected to said arms, said pivot block responding to the change of position of said positioning cam follower to force said arms to pivot and correspondingly causing said cutter roller to move through an arcuate path away from said wrapping chuck to minimize contact therewith after said cutting knife severs said length of tape.

12. A wrapping apparatus as defined in claim 11, wherein the coupling means for said cutting control means includes:

a bell crank pivotally associated with a bar connected between said arms, said bar being positioned below said cutter roller; and a rocker arm pivotally connected to said bell crank and said cutter roller, said bell crank responding to the change of position of said cutter cam follower to pivot on said bar and cause said rocker arm to rotate said cutter roller to bring said cutting knife into contact with the periphery of said wrapping chuck and sever said length of tape.

13. A wrapping apparatus as defined in claim 11, wherein said connecting means also includes a connecting rod, said connecting rod being operatively connected between said positioning cam follower and said pivot block, the length of said connecting rod being adjustable to cause said pivot block to vary the distance between the cutter roller and the wrapping chuck, the decreasing of the distance between the cutter roller and the wrapping chuck by varying the length of said connecting rod increases the pressure applied by said cutting knife against said wrapping chuck when severing said length of tape.

References Cited
UNITED STATES PATENTS

| | | | |
|---|---|---|---|
| 2,834,499 | 5/1958 | Semkow | 156—522 XR |
| 3,031,368 | 4/1962 | Zent | 156—443 XR |
| 3,221,641 | 12/1965 | Adams et al. | 156—522 XR |

PHILIP DIER, *Primary Examiner.*